United States Patent

Strah et al.

[15] 3,643,695
[45] Feb. 22, 1972

[54] FLUID LINE COUPLER

[72] Inventors: Frank L. Strah, Richmond Hgts.; Edward J. Trepannier, Painesville, both of Ohio

[73] Assignee: Commercial Screw Products, Inc.

[22] Filed: Mar. 23, 1970

[21] Appl. No.: 21,728

[52] U.S. Cl. ........................ 137/614.04, 251/149.6, 185/316
[51] Int. Cl. ............................................................. F16l 29/00
[58] Field of Search ............. 251/149.1, 149.5, 149.6, 149.7; 137/614.04; 285/277, 316

[56] References Cited

UNITED STATES PATENTS

| | | | |
|---|---|---|---|
| 2,069,434 | 2/1937 | Eastman | 251/149.1 |
| 2,459,477 | 1/1949 | Van Schuyver | 251/149.5 |
| 2,905,485 | 9/1959 | Zajac | 251/149.6 |
| 3,336,944 | 8/1967 | Anderson et al. | 137/614.04 |

Primary Examiner—William R. Cline
Attorney—Ely, Golrick & Flynn

[57] ABSTRACT

A single hand manipulatable quick-connect-disconnect fluid line coupler with female body portion and a male connector portion attachable to respective line ends by integral fittings. The body is proportioned for manual grasping with two-finger manipulatability of a slidable actuating sleeve; and the body slot convergency and the disposition therein of parallel locking pins engageable with a male portion circumferential locking groove are so related and a simple seal structure provided so as to afford a firm sealed lock under high pressure while facilitating manual actuation in a low-cost structure. Single, double, and nonvalving couplers are shown.

5 Claims, 3 Drawing Figures

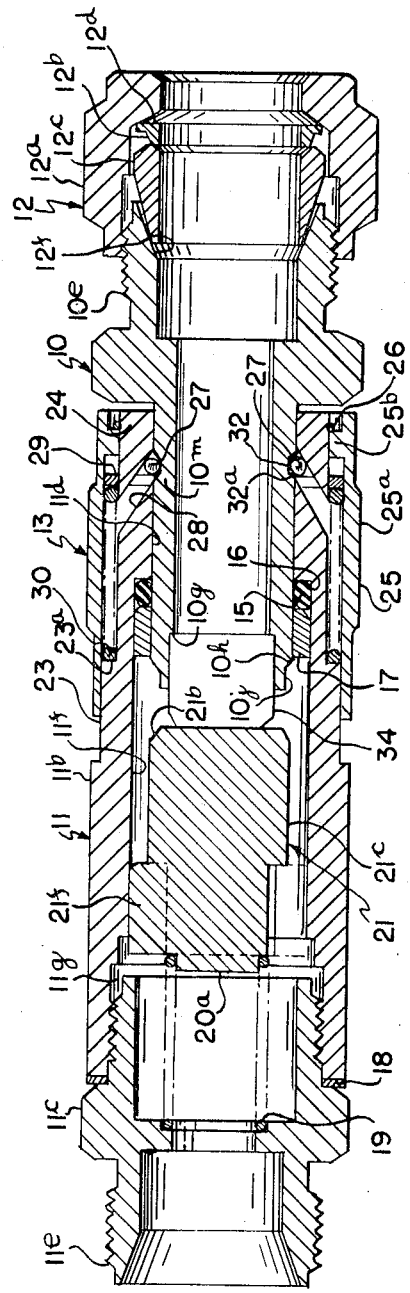
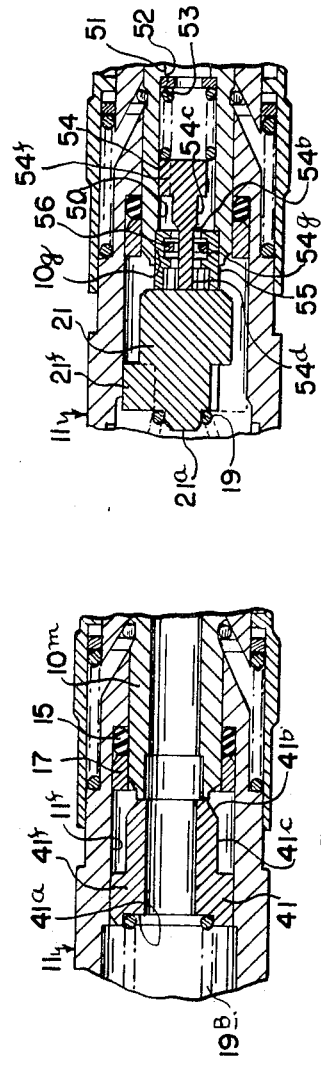
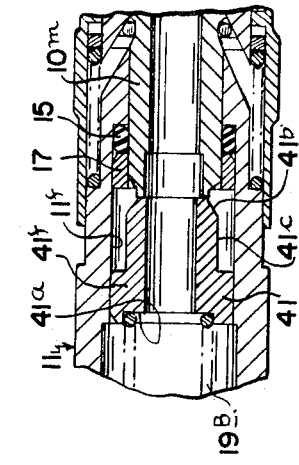
INVENTORS
EDWARD J. TREPANNIER
& FRANK L. STRAH
BY
*Ely, Dohrich & Flynn*
ATTORNEYS

FLUID LINE COUPLER

Various types of quick-connect, quick-disconnect type fluid line couplers are known to the prior art wherein a male element on one line end is sealingly received in a female body component on the other line end and thereto locked by various latching devices such as detent spring elements, catches, spring-biased detent balls; some of these being actuated by a sliding sleeve camming the locking elements or releasing the elements performing the locking function with respect to a groove on the received male connector end; and as well by various bayonet locking systems. Particularly popular have been a type of locking actuation as shown in the Eastman U.S. Pat. No. 2,069,434, wherein parallel pins are slidable in body slots cut inwardly convergent toward the free end of the female body to intersect the bore, the pins being biased inwardly into locking relation with a bore-received grooved male connector portion by a thrust spring and washer surrounding the body, the engagement releasable by a pin-retracting slidable sleeve enclosing the spring, washer and pins. Such devices as that of the patent include in the body a sealing element for the male portion passed therethrough upon coming into lock engagement, also automatic valving means to close off the line to which the female body is attached when a disconnection is effected thereby removing the male element, but displaceable to open position upon completion of the connection.

Various disadvantages have been attendant upon such prior couplers from the viewpoint of single-handed manipulation where adequate sealing under high pressures is achieved, as well as size for the lines to be joined, and cost of fabrication for the results obtained.

The general object of the present invention is to provide an improved coupler having a locking structure generally of the Eastman patent type. By a novel aspect of a seal structure in the female part a simple yet durable seal is incorporated in a comparatively slim body. Also a compact double-valving arrangement is provided further conducive to maintaining a particularly advantageous slim body design, shape and length, permitting ready single-handed manipulation, with an easy release of the connection, while yet obtaining secure locking relation and excellent seal under pressure conditions.

Further, in the general structure for the female portion of the coupling device, the structure for accommodating the female seal is such as to be readily adaptable to couplers of a single-valve type, double-valve type, and of a nonvalving or a throughflow type as herein disclosed in detail.

Other objects and advantages will appear from the following description and the drawing wherein:

FIG. 1 is a generally longitudinal or axial section through a single-valve-type coupler in accordance with the present invention;

FIG. 2 is a fragmentary view similar to FIG. 1, but showing modification for a nonvalving or throughflow type; and FIG. 3 is another fragmentary view similar to FIG. 2 showing modifications of FIG. 1 as for a double-valving type.

In the embodiment of the invention shown in FIG. 1 as a single-valve form, the coupler comprises as principal elements, a male or connector element 10, a female or body assembly 11, similar threaded end portions 10e and 11e of both being provided with connecting fitting assembly means 12 (shown on the end of 10 only) for attachment to piping, flexible hosing, or metal tubing; for example, assembly 12 being shown as a tubing connecting assembly. A similar assembly would be used on the female end 11e where both components are to be attached to tubing; but it is to be understood that other types of connecting fittings could be used for different types of lines on either or both ends.

The coupler assembly further comprises among its main components a manually operable locking assembly as a whole indicated by 13 engaging as hereinafter described the tubular or cylindrical portion 10m of the connector received in the female body or bore 11d of the main body portion 11b, to which it is sealed by an O-ring seal element 15 enclosed in an internal circumferential groove 16 of the body defined between a shoulder (formed between the larger left bore portion 11f and the receiving bore 11d) and an inserted bushing 17.

In a further internally threaded counterbore 11g at the left end of the body there is received a male threaded portion of the end part 11c as a separable element sealed by a gasket 18 and defining a chamber for a curled spring 19 disposed between a shoulder of 11c and at the rear of a sliding element 21 having a piloting teat 20a for the inner spring end. The main body portion 21c is generally circumferentially spaced along its length from the surrounding bore wall 11f to provide a flow space therearound, and is guided in the bore by three equispaced integral fins or vanes 21f at its left end. The major right end portion of 21c has a diameter providing a close sliding fit with the bushing 17, so that with the male or connector element removed, under the bias of the spring 19, the cylindrical portion end bevelled at 21b moving through and beyond the bushing is circumferentially engaged and sealed by the O-ring or seal element 15 by its well known O-ring sealing action.

The right external circumference of the body 11d is twice stepped or reduced in diameter providing a relatively short central portion 23 and a longer smaller diameter portion 24.

In the assembly 13 a locking sleeve 25, externally knurled at 25a, is slideably guided at its left of skirt end on 23 and at its right end on surface 24 by its inward lip or shoulder 25b spaced inward from the right end; and is retained by a split ring 26 engaged in a corresponding circumferential groove near the end of the body surface 24. A pair of parallel pins 27 are retained by sleeve 25 in respective sloping bore-intersecting slots 28, the planes of which converge to the right towards the mouth of the body. The pins projecting endwise from the slots are engaged between shoulder 25b and washer 29, and inwardly biased by the action of a helical spring 30 reacting between the shoulder 23a and the washer 29. The pins must, of course, be somewhat shorter than the "chord" to the internal surface of the sleeve represented by their axes when in maximum depth positions in the slots to provide end clearance allowing sufficient ramping up the slots, to allow the pins to escape groove 32.

The pins 27 when in locking position engage in the circumferential groove 32 on and spaced inwardly from the end of the male or received extension 10m of the connector, restraining the connector from expulsion by engaging the sloping groove wall 32a so that in locked condition the end as shown projects through and beyond the seal 16.

In this symmetrical arrangement each of the parallel-walled similarly disposed slots 28 is directed at an angle of substantially 35° to the axial centerline of the system, and carried in to intersect the bore at a distance slightly greater than that indicated by the location of the pins. The forward wall 32a of this groove, as it were a bevel wall, toward the free end of the connector has a slope angle of about 30°; the groove here being shown as flat bottomed.

The left end of the tubular male portion is substantially reduced, at 10j, to a diameter less than the spacing between the pins 27 when in inmost position absent the connector, the reduced portion 10g then through a bevel or slope 10h leading to the main diameter of the tubular portion 10m (this bevel having a slope angle of 30° to facilitate a camming of the pins upwardly into the slots for passage of the main tubular diameter until the groove 32 is encountered.

Further at the left end of the tubular male portion 10m there is received, in either a counter bore 10g or a pair of diametrically opposed short parallel inward slots, a tongue or blade 34 secured in position as a valve opening or displacing tongue of finger for the valve element 21.

It will be observed that a considerable body length is provided to the left of the reduced portion 23 including as well the end element or portion 11c for manual grasping in the palm area of one hand with the sleeve 25 then accessible to the forefinger and thumb for backward withdrawal against the force of the spring 30. This (with the various relations above stated) permits an easy disconnect by the action of the sleeve shoulder of lip 25b bearing against the projecting pin ends, carrying the pins rearwardly and up the ramp slope of the slots 28, hence out of engagement with the groove 32, allowing withdrawal of the connector.

As the connector is withdrawn, the sliding valving element 21 follows passing into the internal bore of the bushing 17 before the connector loses sealing contact with the O-ring by virtue of the above described spacings. Further as the withdrawal continues, the cylindrical portion 21c of the body passes further down into the bore 11d so that 15 makes sealing contact with he cylindrical body 21c; the vanes 21f stopping against the end of the bushing 17.

Thus the line connected to the end 11e is sealed from loss of fluid by the O-ring upon complete connector withdrawal; furthermore fluid loss is in high degree impeded by entrance of 21c into the bushing 17 before sealing contact of the O-ring on 10n is lost, and only a short length of travel in correspondingly short time exists when there is not also an O-ring seal, as represented by the spacing between the end of the bevel 10h and the bevel on 21c.

It will be observed that apart from the assembly 12, the two springs, the pins, the retaining ring, the gasket and the O-ring, the coupler is essentially an item adapted for screw-machine-type production, and further to simple and ready assembly by virtue of the structure of and the small number of components. The bushing 17 may be held by a suitable adhesive, by a press fit, or brazing before O-ring is in place.

In the nonvalving or throughflow form of FIG. 2, the structure is generally as described for FIG. 1. However, in this case the tongue or blade 34 of the FIG. 1 form is omitted, and the component 21 of FIG. 1 is modified as the slide element here designated 41; and also modified is the bias spring therefor, as designated 18b. The slide element 41 is generally proportioned as in FIG. 1, having, however, a throughbore or passage of about the diameter of the passage in 10m; and, at its left end in place of fins such as 21 in FIG. 1, having a full diameter cylindrical portion 41f closely slideably received in the bore 11f, with a reduced cylindrical body portion 41c at the right bevelled at 41b again to be slidingly received in the bushing 17.

For this coupler form, the locking and unlocking action with single-handed operation, so also the ease of fabrication and assembly, are generally as described for FIG. 1. In this case the action of the body 41 in following the withdrawn connector, though not resulting in any valving action, the passing of the reduced body portion 41c through and beyond the O-ring 15, here serves the useful purpose in the disconnected condition of keeping the O-ring positioned in its groove, in its proper shape, and free of dirt and dust that might impede the seal; and also affording again ready entrance of the connector 10m into sealing relation upon reconnection.

In FIG. 3 the general construction is again similar to that of FIG. 1, the assembly and construction of the female portion 11 being strictly identical with that of FIG. 1. The modification to provide a double-valving action is presented by valving structure now provided in and projecting from the bore region of the male tubular portion 10m.

For the valving assembly of FIG. 3 in the male connector, there is provided a slight counterbore running from counterbore 10g into the main bore of 10m to form a shoulder 51 supporting a spring-retaining washer 52 for the right end of the spring 53 with left end bearing against a valving element 54. The element 54 has three equiangularly spaced axial fins 54f slideably guiding on the counterbore wall 50 and providing flow space past the valve element; a first reduced left end portion 54c tapering through a bevel 54b to an actuating extension or rod 54d engageable with the end of 21. A cylindrical structure or sleeve 55, received and held in the counterbore 10g as a valve body element of the connector assembly, contains an O-ring 56 in an internal groove 54g near its right end. At its left end beyond the groove left wall the element 55 is radially ported or slotted to provide ample flow area radially inward through the central aperture into the bore of 10m.

Here again this structure is generally simple and readily assembled; and apart from the springs, the O-ring and perhaps the valving element 54 again most components are screw machine products.

It is obvious here that when the elements or components are disconnected the bias of spring 18 will move 21 into valve closed position as previously described; and also that the valving element 54 will be moved by spring 53 to bring its valving body portion 54c into sealing engagement with the O-ring 56.

Upon insertion of the FIG. 3 male member into the female member, the rod 54d is projecting beyond the sleeve element 55. However, the tubular portion 10m is well into the female bore 11d beyond the location of the slots 28, before the rod 55 encounters the end of the valve 21. The spring rate of 53 is selected so that valve 54 will open before 21. The element 54 is first displaced completely into the same position relative to the other male or connector component elements as shown in FIG. 3, whereupon the end of the sleeve or element 55 then encounters the body 21 so that by continued insertion motion, the valve 21 is now displaced with an action similar to that previously described relative to FIG. 1.

As can be seen, advantageously the common structure of the drawings provides a small outside diameter of the coupler for the flow areas obtained and other internal structure involved, in a manner which is adapted to low-cost turning operations, by virtue of the manner in which the seal-ring-retaining structure is formed, while in the double-valving form the male part is adapted for cooperating with a female part such as serves in a single-valving arrangement.

What is claimed is:

1. In a fluid line coupler including a female part and a male part each with a respective rear end adapted for connection to a fluid line end, the forward ends of said parts mutually adapted for reception of the male inserted in a coaxial bore of a body of the female, the inserted male portion being tubular and having an external circumferential groove spaced from its insertion end, and the female body provided with like oblique pin-receiving slots directed forwardly inwardly convergently to intersect said axial bore at diametrically opposite locations, a respective pin in each of said slots adapted to engage in said groove thereby to retain the male part locked in said bore, spring bias means surrounding a forepart of the female body engaging behind opposite ends of each pin and urging the pins down said slots to a male part locking position, and a release-actuating sleeve slidable on said body enclosing said spring-biased means and having a shoulder engageable with the front of opposite ends of each pin, an O-ring retaining internal groove in said bore spaced inwardly from said slots bore spaced inwardly from said slots and an O-ring said internal groove to engage and circumferentially seal on the inserted tubular portion, an axially slidable member disposed in an axial counterbore beyond the O-ring groove and spring biased toward said O-ring location, said member having a trailing portion slidably guided in said counterbore and a leading portion of a reduced diameter corresponding to the diameter of said axial bore in length sufficient to enter and extend into said axial bore beyond said O-ring when said tubular portion is withdrawn from the axial bore and axially displaceable against said spring bias out of said axial bore by the inserted end of a said tubular portion, that improvement comprising a female body having an axial bore portion extending inwardly to terminate at a radially outwardly extending shoulder and a coaxially aligned larger bore extending inwardly from the other end to said shoulder, and a short bushing with internal and external diameters equal respectively to the diameters of said axial bore portion and larger bore and disposed in said larger bore in spaced relation to said shoulder to define first with said shoulder said O-ring retaining groove, secondly with said axial bore portion said axial bore, and thirdly with the remainder of said larger bore said counterbore;

the trailing end of said member having at least three vanelike projections engaging said counterbore to provide slidable guides and fluid passages therebetween from the rear to forward portion of the member, and said reduced portion of pluglike form to form a fluid-retaining valve upon projection through said O-ring and said tubular portion including in its insertion end an externally cylindrical sleeve element having a slotted portion projecting endwise beyond said tubular portion engageable endwise with said reduced portion to afford a fluid flow space from said counterbore into said tubular portion when locked in the female part; the length of the projecting element such as to provide a spacing between the proximate ends of the full diameters of said tubular portion and said reduced portion at least equal to the distance from the inner end of said axial bore and the center plane of said O-ring; said male part including valving means comprising, in said tubular portion, a counterbore extending inwardly from its insertion end to a first radially inward shoulder and a short larger second counterbore terminating at a second radially inward shoulder near the insertion end for receiving said sleeve element fitted therein against said second shoulder, said sleeve element also having in its other end a pair of spacedlike internal circumferential ribs defining a circumferential seal-receiving slot, a seal retained in the last said slot, a valving slide coaxially including a cylindrical mid portion and an enlarged inner trailing end portion and an elongated reduced leading actuating end portion, the trailing end portion including a plurality of guide vanes slideable on said first counterbore and defining fluid passages through the trailing end portion, said actuating portion greater in length than said sleeve element; said mid portion adapted for sealing contact with said seal upon advance into said sleeve element, and spring means interposed between said first shoulder and said trailing portion for biasing the valving slide toward said sleeve element; the rates of the valve-biasing spring means in the male and female parts selected so that the force exerted by the spring means on the slidable member is greater than that exerted by the spring means on the valving slide.

2. The improved coupler as described in claim 1, wherein the planes of said slots are each inclined to the bore axis at an angle of from 25° to 35°; and said groove has a sloping forward wall surface inclined to the axis of said tubular portion of from 25° to 45°.

3. A coupler as described in claim 1, wherein the first said shoulder is a shallow shoulder with a flat washer inserted thereagainst to increase its effective inward radial dimension, and a prestressed helical compression spring is interposed between said washer and valving slide as the respective biasing spring means.

4. A coupler as described in claim 3, wherein said seal is an elastomeric O-ring adapted to seal said midportion to said sleeve element; and said actuating portion of the valving slide is joined to said mid portion through a short tapered shoulder.

5. In a fluid line coupler including a female part and a male part each with a respective rear end adapted for connection to a fluid line end, the forward ends of said parts mutually adapted for reception of the male inserted in a female body axial bore, the inserted male portion being tubular and having an external circumferential groove spaced from its insertion end, and the female body portion provided with locking elements engageable in said groove thereby to retain the male part locked in said bore, external manually actuatable release means for releasing said elements from groove engagement, a seal-retaining internal groove in said bore spaced inwardly from the locked location of said external groove and a ring seal received therein to engage and circumferentially seal on the inserted tubular portion, an axially slidable valving member having a trailing portion slidably guided in an axial counterbore beyond the seal groove and spring means biased toward said seal location, said member having a leading cylindrical portion of a diameter reduced to that of said axial bore and of a length sufficient to enter into said axial bore and into said seal thereby to close the respective line against fluid leakage when said tubular portion is withdrawn and axially displaceable against said spring bias out of said axial bore by the inserted end of a said tubular portion, said trailing end having fluid passages from the rear to the forward portion of the member; and valving means in said male part comprising, in the insertion end of said tubular portion, an externally cylindrical sleeve element having a slotted portion projecting endwise beyond said tubular portion and engageable endwise with the reduced cylindrical portion to afford a fluid flow space from said counterbore into said tubular portion when locked in the female part, the length of the projecting element portion such as to provide a spacing between the proximate ends of the full diameters of said tubular portion and said reduced portion at least equal to the distance from the inner end of said axial bore and the center plane of said ring seal, a first counterbore extending inwardly from its insertion end to a first radially inward shoulder and a short larger second counterbore terminating at a second radially inward shoulder near the insertion end for receiving said sleeve element fitted therein against said second shoulder, said sleeve element also having in its other end a pair of spacedlike internal circumferential ribs defining a circumferential seal-receiving slot, a seal retained in the last said slot, a valving slide coaxially including a cylindrical midportion and an enlarged inner trailing end portion and an elongated reduced leading actuating end portion, the trailing end portion including a plurality of guide vanes slideable on said first counterbore and defining fluid passages through the inner trailing end portion, said actuating portion greater in length than said sleeve element; sad midportion adapted for sealing contact with the first said seal upon advance into said sleeve element, and spring means interposed between said first shoulder and said inner trailing end portion for biasing the valving slide toward said sleeve element; the rates of the valve biasing spring means in he male and female parts selected so that the force exerted by the spring means on the slidable member is greater than that exerted by the spring means on the valving slide.

* * * * *